US012617365B1

(12) United States Patent
　　Thomas et al.

(10) Patent No.:　US 12,617,365 B1
(45) Date of Patent:　　May 5, 2026

(54) INTEGRATED ROOF RAIL AIRBAG AND INTERIOR TRIM ASSEMBLY FOR AUTOMOTIVE VEHICLES

(71) Applicant: GM GLOBAL TECHNOLOGY OPERATIONS LLC, Detroit, MI (US)

(72) Inventors: Matthew D. Thomas, Sterling Heights, MI (US); David A. King, Milford, MI (US); Kristina M. Hubarth, Oxford, MI (US); Tanja Kryzaniwskyj, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/079,631

(22) Filed: Mar. 14, 2025

(51) Int. Cl.
　　*B60R 21/232*　　(2011.01)
　　*B60R 21/213*　　(2011.01)
(52) U.S. Cl.
　　CPC .......... *B60R 21/232* (2013.01); *B60R 21/213* (2013.01)
(58) Field of Classification Search
　　CPC ........................... B60R 21/232; B60R 21/213
　　See application file for complete search history.

(56) References Cited

U.S. PATENT DOCUMENTS 6,220,623 B1 * 4/2001 Yokota ................. B60R 21/213
　　　　　　　　　　　　　　　　　　280/730.2
6,227,561 B1 * 5/2001 Jost .................... B60R 13/0212
　　　　　　　　　　　　　　　　　　280/730.2

6,451,233 B1 * 9/2002 Byma ................... B60R 21/213
　　　　　　　　　　　　　　　　　　264/46.7
6,585,287 B1 * 7/2003 Spaulding ............. B60R 21/213
　　　　　　　　　　　　　　　　　　280/730.2
7,163,231 B2 * 1/2007 Kumagai .............. B60R 21/213
　　　　　　　　　　　　　　　　　　280/730.2

(Continued)

FOREIGN PATENT DOCUMENTS

JP　　　　2009143352 A　　7/2009

OTHER PUBLICATIONS

"Standard Test Method for Flexural Properties of Polymer Matrix Composite Materials" Jan. 29, 2008, Norm ASTM D7264/D 7264M-07, pp. 1-11.

*Primary Examiner* — Jason D Shanske
*Assistant Examiner* — Joselynn Y Sliteris
(74) *Attorney, Agent, or Firm* — Quinn IP Law

(57)　　　　　　　　ABSTRACT

The present disclosure teaches an integrated roof rail airbag/trim assembly and methods for attaching the integrated roof rail airbag/trim assembly to a vehicle body before a roof structure or glass roof has been attached. The attachment method may be performed with an automated robot. The integrated roof rail airbag/trim assembly includes an airbag carrier structural frame and a roof rail airbag assembly, which includes a roof rail airbag and a roof rail airbag inflator. The roof rail airbag assembly is attached to, and is physically integrated with, the airbag carrier structural frame. The airbag carrier structural frame may include a corrugated airbag carrier structural channel that is rigidly attached to a corrugated roof trim channel. The integrated roof airbag/trim assembly may have at least one automated grab point that is configured to permit automated robotic attachment of the integrated roof airbag/trim assembly to a vehicle body.

20 Claims, 8 Drawing Sheets

SEC A-A

(56)                    References Cited

U.S. PATENT DOCUMENTS

| | | | | |
|---|---|---|---|---|
| 7,654,559 B2 * | 2/2010 | Hidaka | ................ | B60R 21/213 |
| | | | | 280/730.2 |
| 7,694,998 B2 * | 4/2010 | Hidaka | ................ | B60R 21/213 |
| | | | | 280/730.2 |
| 7,735,857 B2 * | 6/2010 | Hidaka | ................ | B60R 21/232 |
| | | | | 280/730.2 |
| 7,762,581 B2 * | 7/2010 | Kino | .................... | B60R 21/232 |
| | | | | 280/730.2 |
| 8,317,221 B2 * | 11/2012 | Hemingway | ......... | B60N 3/026 |
| | | | | 280/730.2 |
| 10,562,481 B2 * | 2/2020 | Hayashi | ................ | B60R 21/233 |
| 10,632,960 B2 * | 4/2020 | Okuhara | .............. | B60R 21/213 |
| 12,097,819 B2 * | 9/2024 | Ishibashi | .............. | B60R 21/232 |

* cited by examiner

SEC A-A

SEC B-B

SEC C-C

SEC D-D

SEC E-E

SEC D-D

INTEGRATED ROOF RAIL AIRBAG AND INTERIOR TRIM ASSEMBLY FOR AUTOMOTIVE VEHICLES

This disclosure relates to integrated roof rail airbag/trim assemblies for automated robotic manufacture of automotive vehicles. Roof rail airbags are generally installed manually during vehicle manufacture, because automated robots may have difficulty in handling and manipulating a flexible, unsupported roof rail airbag assembly.

SUMMARY

The present disclosure teaches an integrated roof rail airbag/trim assembly and methods for attaching the integrated roof rail airbag/trim assembly to a vehicle body before a roof structure or glass roof has been attached. The attachment method may be performed with an automated robot. The integrated roof rail airbag/trim assembly includes an airbag carrier structural frame and a roof rail airbag assembly, which includes a roof rail airbag and a roof rail airbag inflator. The roof rail airbag assembly is attached to, and is physically integrated with, the airbag carrier structural frame. The airbag carrier structural frame may include a corrugated airbag carrier structural channel that is rigidly attached to a corrugated roof trim channel. The integrated roof airbag/trim assembly may have at least one automated grab point that is configured to permit automated robotic attachment of the integrated roof airbag/trim assembly to a vehicle body.

In a first embodiment, an integrated roof rail airbag/trim assembly has an airbag carrier structural frame and a roof rail airbag assembly including a roof rail airbag and a roof rail airbag inflator; The roof rail airbag assembly is attached to, and is physically integrated with, the airbag carrier structural frame. The airbag carrier structural frame is made of an airbag carrier structural channel that is rigidly attached to a roof trim channel. The airbag carrier structural frame may be attached to an A-pillar of a vehicle body with an A-pillar body attachment bracket, and also may be attached to a C-pillar of the vehicle body with a C-pillar body attachment bracket.

In some embodiments, the integrated roof airbag/trim assembly may have at least one automated grab point that permits automated robotic attachment of the integrated roof airbag/trim assembly to a vehicle body. The integrated roof airbag/trim assembly may have a beam bending stiffness that is greater than or equal to about 20 N–m$^2$ before the integrated roof airbag/trim assembly has been attached to the vehicle body.

In some embodiments, the roof rail airbag assembly includes one or more support structures that transfer deployment forces generated by an activated roof rail airbag to the vehicle's body structure, while maintaining integrity of the integrated roof airbag/trim assembly during deployment of the activated roof rail airbag. The integrated roof airbag/trim assembly may be positioned in-between an A-pillar and a C-pillar of the vehicle body.

In some embodiments, the A-pillar body attachment bracket is hinged at one or more places and a front portion of a length of the integrated roof airbag/trim assembly may be folded back and shortened before the integrated roof airbag/trim assembly is attached to the vehicle body.

In some embodiments, the C-pillar body attachment bracket is hinged at one or more places and a rear portion of a length of the integrated roof airbag/trim assembly may be folded back and shortened before the integrated roof airbag/ trim assembly is attached to the vehicle body. The A-pillar body attachment bracket and the C-pillar body attachment bracket may be located above the roof rail airbag assembly and they may be configured to provide a shaped, structural reaction surface that guides deployment of an activated roof rail airbag in an inwardly-downward direction pointing between an occupant's sitting position and a vehicle-side daylight opening.

In some embodiments, the airbag carrier structural frame is structurally configured to transfer roof rail airbag deployment forces directly to the vehicle body, thereby causing airbag deployment in the inwardly-downward direction when the roof rail airbag is activated. The roof rail airbag may have a stress concentration feature that is oriented parallel to a centerline along a length of the roof rail airbag, which permits airbag deployment in an optimum direction when the roof rail airbag is deployed.

In some embodiments, an airbag/trim assembly method includes: (1) attaching a roof rail airbag assembly to an airbag carrier structural frame, thereby forming an integrated roof airbag/trim assembly, and then (2) attaching the integrated roof airbag/trim assembly to the vehicle body. The roof rail airbag assembly includes a roof rail airbag and a roof rail airbag inflator. The airbag carrier structural frame is made of an airbag carrier structural channel that is rigidly attached to a roof trim channel. The airbag/trim assembly method may use an automated robot to attach the integrated roof airbag/trim assembly to the vehicle body using one or more automation grab points on the integrated roof airbag/trim assembly.

In some embodiments, the airbag/trim assembly method may include folding back a hinged front portion of the integrated roof airbag/trim assembly; and/or folding back a hinged rear portion of the integrated roof airbag/trim assembly. Doing this shortens a total length of the integrated roof airbag/trim assembly before it is attached to the vehicle body. Shortening the total length may create a dimensional clearance sufficiently large for one or more body-side attachment studs to be fitted to a vehicle body during vehicle body assembly and build.

In some embodiments of an airbag/trim assembly method, the integrated roof airbag/trim assembly may have a beam bending stiffness that is greater than or equal to about 20 N–m$^2$, or that is greater than or equal to about 25 N–m$^2$, before attaching the integrated roof airbag/trim assembly to the vehicle body. The assembly method may include installing a roof structure or a glass roof on the vehicle body after the integrated roof airbag/trim assembly has been attached to the vehicle body.

In some embodiments of an airbag/trim assembly method, the integrated roof airbag/trim assembly has one or more automation grab points that permit automated robotic attachment of the integrated roof airbag/trim assembly to a vehicle body, using at least one airbag carrier attachment stud that may not be covered with a bolt cover.

In some embodiments of an airbag/trim assembly method, the roof rail airbag assembly is located in-between an A-pillar and a C-pillar of a vehicle body module.

In some embodiments of a vehicle, the vehicle includes a vehicle body, a set of road wheels connected to the vehicle body, an airbag carrier structural frame, and a roof rail airbag assembly that includes a roof rail airbag and a roof rail airbag inflator. The roof rail airbag assembly is attached to, and physically integrated with, the airbag carrier structural frame before the roof rail airbag assembly is attached to the vehicle body.

DETAILED DESCRIPTION OF THE DISCLOSURE

The integrated roof rail airbag/trim assemblies disclosed herein may be used in any type of vehicle, car, truck, cart, train, airplane, or other vehicle that requires airbag protection.

The term "vehicle body module" means a monolithic, integrated structural frame that comprises at least a portion of a vehicle body.

Figure 1:
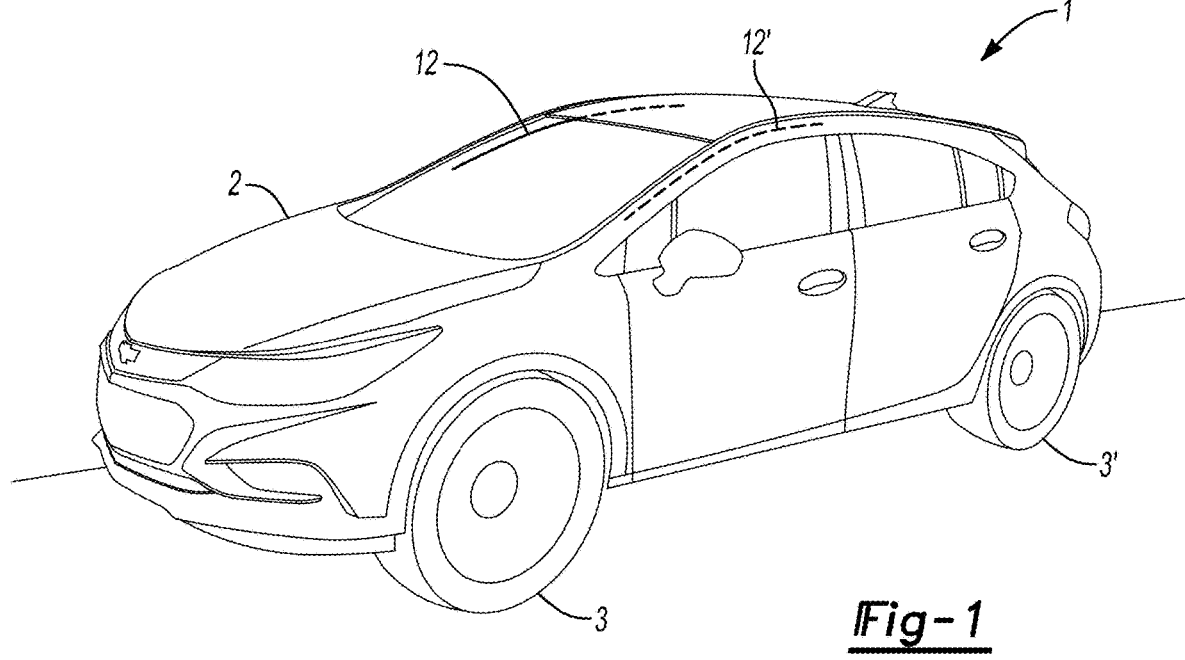
FIG. 1 shows a schematic, perspective view of an example of an automotive vehicle with a vehicle body, a set of attached wheels, and a pair of attached roof rail airbags on the passenger side and the driver's side of the vehicle.

FIG. 1 shows a schematic perspective view of an example of an automotive vehicle 1 with a vehicle body 2, a set of attached wheels 3, 3', and a pair of roof rail airbags 12, 12', on the passenger side and the driver's side of vehicle 1, respectively, attached to vehicle 1.

Figures 2A, 2B:
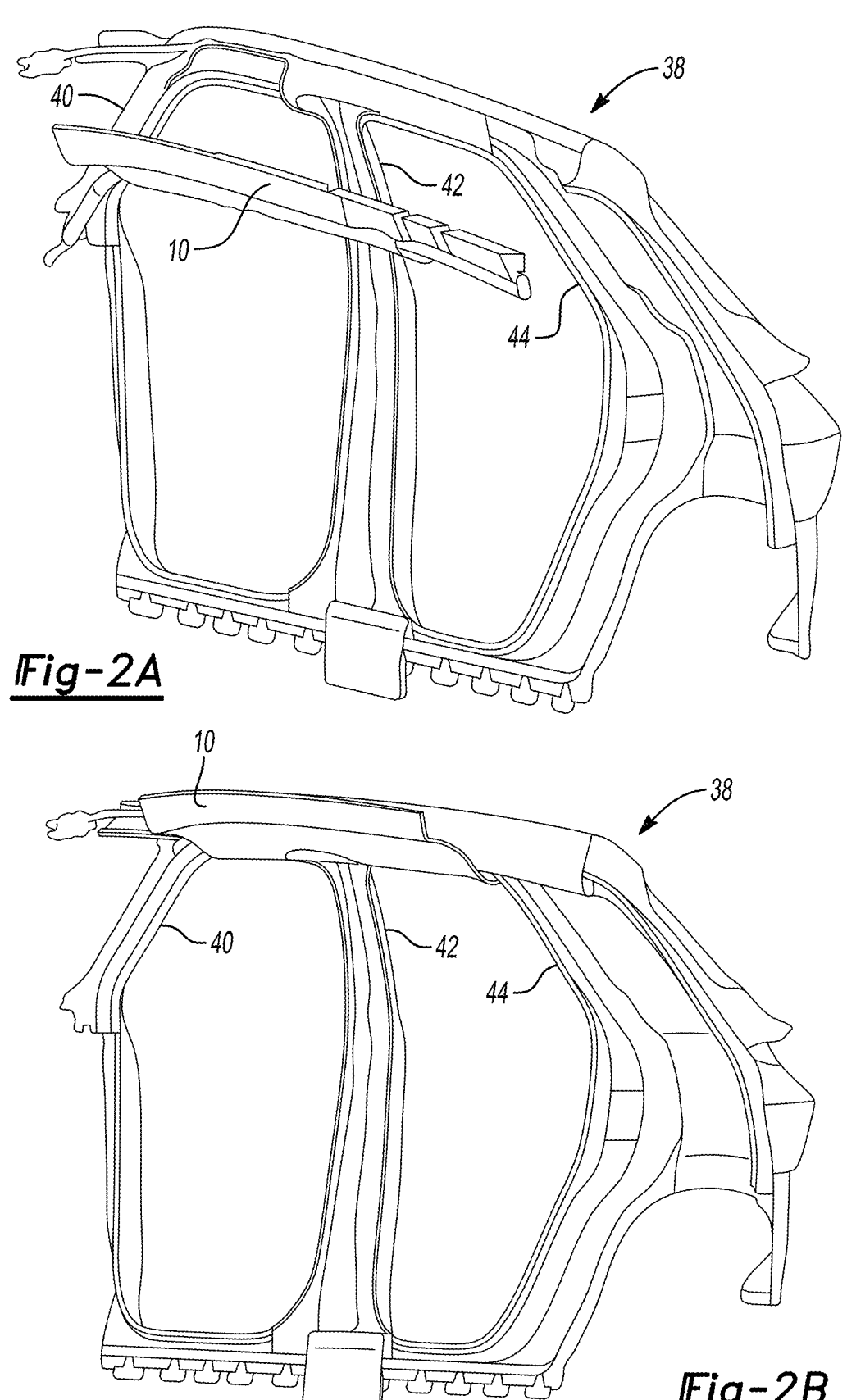
FIG. 2A shows a perspective view of an example of a vehicle body module with an integrated roof rail airbag/trim assembly before being attached to the vehicle body module.
FIG. 2B shows a perspective view of an example of a vehicle body module with an integrated roof rail airbag/trim assembly after being attached to the vehicle body module at a position disposed in-between the module's A-pillar and C-pillar.

FIG. 2A shows a perspective view of an example of a vehicle body module 38 with an integrated roof rail airbag/trim assembly 10 before being attached to vehicle body module 38. Vehicle body module 38 has three vertical structural pillars: A-pillar 40, B-pillar 42, and C-pillar 44.

FIG. 2B shows a perspective view of an example of a vehicle body module 38 with an integrated roof rail airbag/trim assembly 10 after being attached to vehicle body module 38 at a position disposed in-between A-pillar 40 and C-pillar 44.

Figure 3:
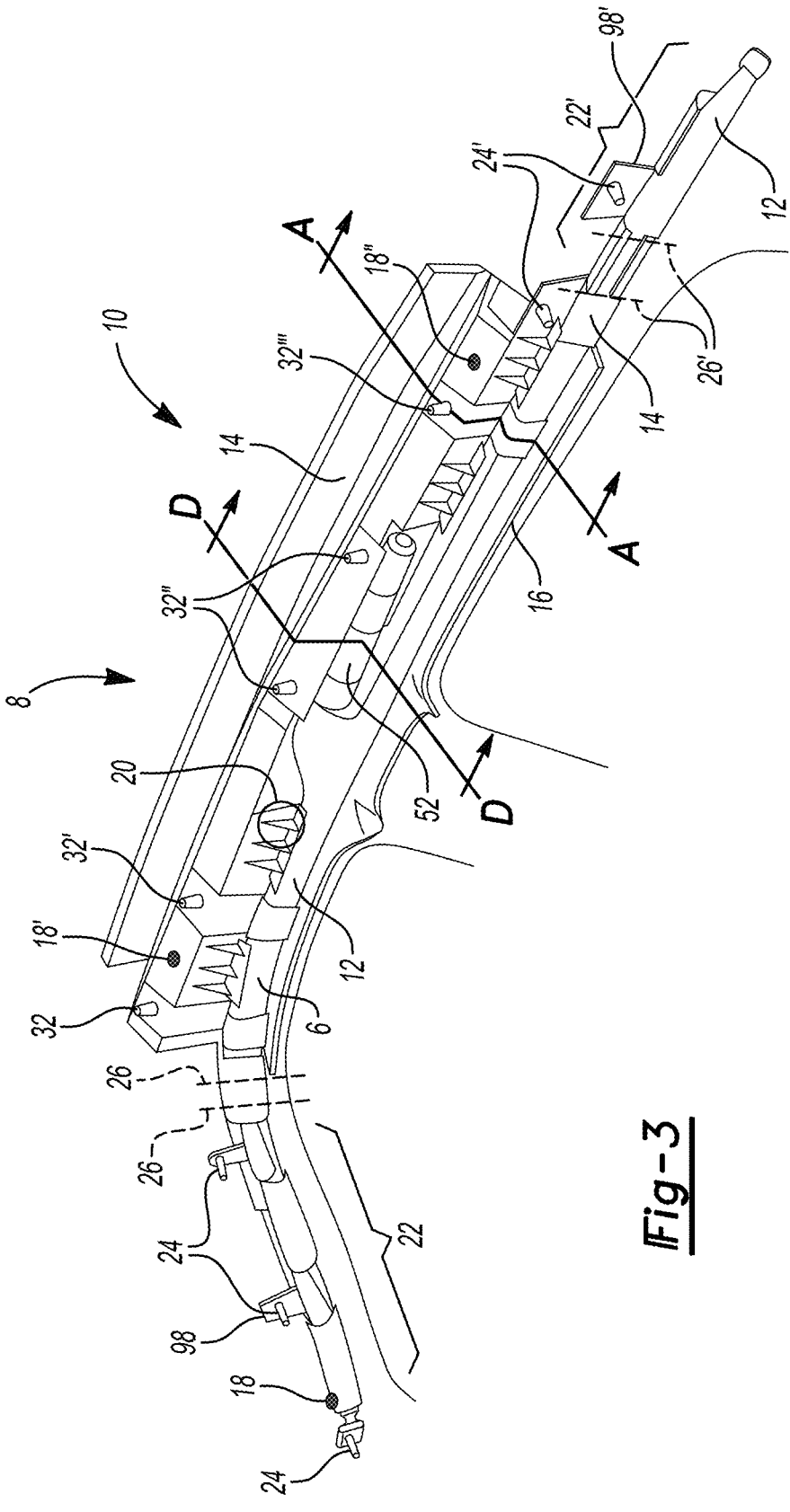
FIG. 3 shows a schematic perspective view of an example of an integrated roof rail airbag/trim assembly before being attached to a vehicle body module.

FIG. 3 shows a schematic perspective view of an example of integrated roof rail airbag/trim assembly 10 before being attached to vehicle body module 38 (see FIGS. 2A and 2B). Integrated roof rail airbag/trim assembly 10 comprises airbag carrier structural frame 8 with attached roof rail airbag assembly 12. Roof rail airbag assembly 12 comprises roof rail airbag 6 and airbag inflator 52. Roof rail airbag assembly 12 is attached to, and physically integrated with, airbag carrier structural frame 8. Airbag carrier structural frame 8 comprises airbag carrier structural channel 14, which is rigidly attached (e.g., spot welded, riveted, or adhesively attached) to roof trim structural channel 16. Airbag carrier structural channel 14 comprises a plurality of automation grab points 18, 18', 18", etc. Automation grab points 18, 18', 18", etc. may be used by an automated robot (not shown) to hold, carry, orient, and position integrated roof rail airbag/trim assembly 10 into a desired position and orientation for permanent attachment to vehicle body module 38 (see FIGS. 2A and 2B). Integrated roof rail airbag/trim assembly 10 may be attached to vehicle body module 38 (see FIGS. 2A and 2B) with different types of fasteners/attachments, including: (a) airbag carrier attachment studs, 32, 32', 32", 32''', etc.; (b) roof rail airbag attachment studs 24, 24'; (c) A-pillar body attachment bracket 98 configured for attaching roof rail airbag assembly 12 to A-pillar 40; and (d) C-pillar body attachment bracket 98' configured for attaching roof rail airbag assembly 12 to C-pillar 44. Airbag carrier structural channel 14, along with stiffening rib 20, securely holds airbag 6.

Referring still to FIG. 3, roof rail airbag assembly 12 may further comprise at least one front airbag hank back hinge 26, and at least one rear airbag hank back hinge 26'. Front airbag hank back hinge 26 may be used to fold back and temporarily shorten a front portion 22 of airbag 6 before integrated roof airbag/trim assembly 10 is attached to vehicle body module 38 (not shown). Likewise, rear airbag hank back hinge 26' may be used to fold back and temporarily shorten a rear portion 22' of airbag 6 before the integrated roof airbag/trim assembly 10 is attached to vehicle body module 38 (not shown). Temporarily folding back the front and/or rear portions 22 and 22', respectively, of airbag 6 may create a sufficiently-large dimensional clearance for one or more body-side structural attachment bolts/studs (not shown) to be fitted during vehicle body module assembly and build.

Figures 4, 5:
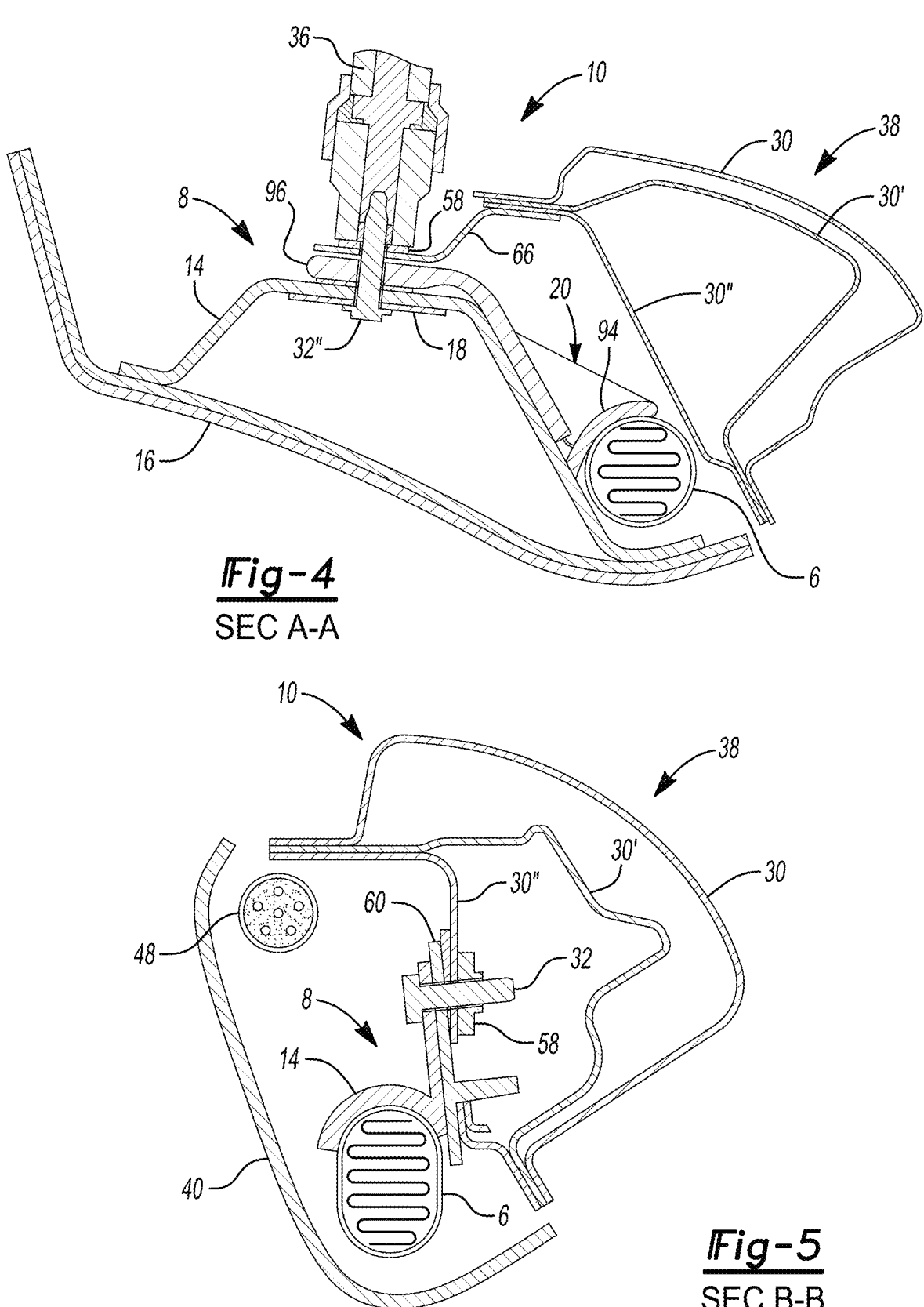
FIG. 4 shows a cross-sectional view, Section A-A, of an example of an integrated roof rail airbag/trim assembly attached to a vehicle body module.
FIG. 5 shows a cross-sectional view, Section B-B, of an example of an integrated roof rail airbag/trim assembly attached to a vehicle body module.

FIG. 4 shows a cross-sectional view, Section A-A (see FIG. 3), of an example of integrated roof rail airbag/trim assembly 10 attached to vehicle body module 38. Integrated roof rail airbag/trim assembly 10 comprises airbag carrier structural frame 8 with attached roof rail airbag 6. Roof rail airbag 6 may be attached to, and physically integrated with, airbag carrier structural frame 8 before integrated roof rail airbag/trim assembly 10 is attached to vehicle body module 38 (see FIGS. 2A and 2B). Airbag carrier structural frame 8 comprises a pair of corrugated or shaped structural channels: airbag carrier structural channel 14 and roof trim structural channel 16, which are rigidly attached to each other (e.g., by riveting, spot welding, or adhesive (glue) joining) to make airbag carrier structural frame 8. Airbag carrier structural channel 14 and stiffening rib 20 holds airbag 6 in a secure, fixed position relative to inner body structural panel 30". Airbag carrier structural channel 14 also has an airbag backing structure 94 that is configured to transfer deployment forces generated by an activated roof rail airbag 6 to body module 38, while maintaining integrity of integrated roof airbag/trim assembly 10 during deployment of airbag 6.

Referring still to FIG. 4, airbag carrier attachment stud 32 attaches airbag carrier structural channel 14 to three, joined-together, structural panels of body module 38, including: outer body structural panel 30, middle body structural panel 30', and inner body structural panel 30'', via vehicle body attachment bracket 66. Airbag carrier attachment stud 32 may be inserted into a hole (not numbered) in airbag carrier structural channel 14 and then nut driver 36 may be used to attach weld nut 58 to airbag carrier attachment stud 32 before a roof structure (not shown) is installed and attached to body module 38. In some embodiments, nut driver 36 may be robotically-operated. Curved support plate 96 is disposed in-between airbag carrier structural channel 14 and vehicle body attachment bracket 66; and is attached to stiffening rib 20 for supporting airbag 6.

FIG. 5 shows a cross-sectional view, Section B-B, of an example of integrated roof rail airbag/trim assembly 10 attached to vehicle body module 38. Integrated roof rail airbag/trim assembly 10 comprises airbag carrier structural frame 8 with attached roof rail airbag 6. Roof rail airbag 6 may be attached to, and physically integrated with, airbag carrier structural frame 8 before integrated roof rail airbag/trim assembly 10 is attached to vehicle body module 38 (See FIGS. 2A and 2B). Airbag carrier structural frame 8 comprises a pair of corrugated or shaped structural channels: airbag carrier structural channel 14 and roof trim structural channel 16, which are rigidly attached to each other (e.g., by riveting, spot welding, or adhesive (glue) joining) to make airbag carrier structural frame 8. Airbag carrier structural channel 14 holds airbag 6 in a secure, fixed position relative to inner body structural panel 30''. Airbag carrier structural channel 14 transfers deployment forces generated by an activated roof rail airbag 6 to body module 38, while maintaining integrity of integrated roof airbag/trim assembly 10 during deployment of airbag 6.

Referring still to FIG. 5, airbag carrier attachment stud 32 attaches airbag carrier structural channel 14 directly to inner body structural panel 30'' of body module 38 with weld nut 58. Airbag carrier attachment stud 32 may be inserted robotically (or manually) 32 into a hole (not numbered) in airbag carrier structural channel 14, optionally by nut driver 36 (not shown, see FIG. 4). Stud 32 may be secured by weld nut 58. Carrier reinforcement plate 60 may be located in-between airbag carrier structural channel 14 and inner body structural panel 30'' to reinforce attachment of roof rail airbag attachment stud 32. A-pillar 40 and wiring harness 48 are illustrated in this figure.

Figures 6, 7:
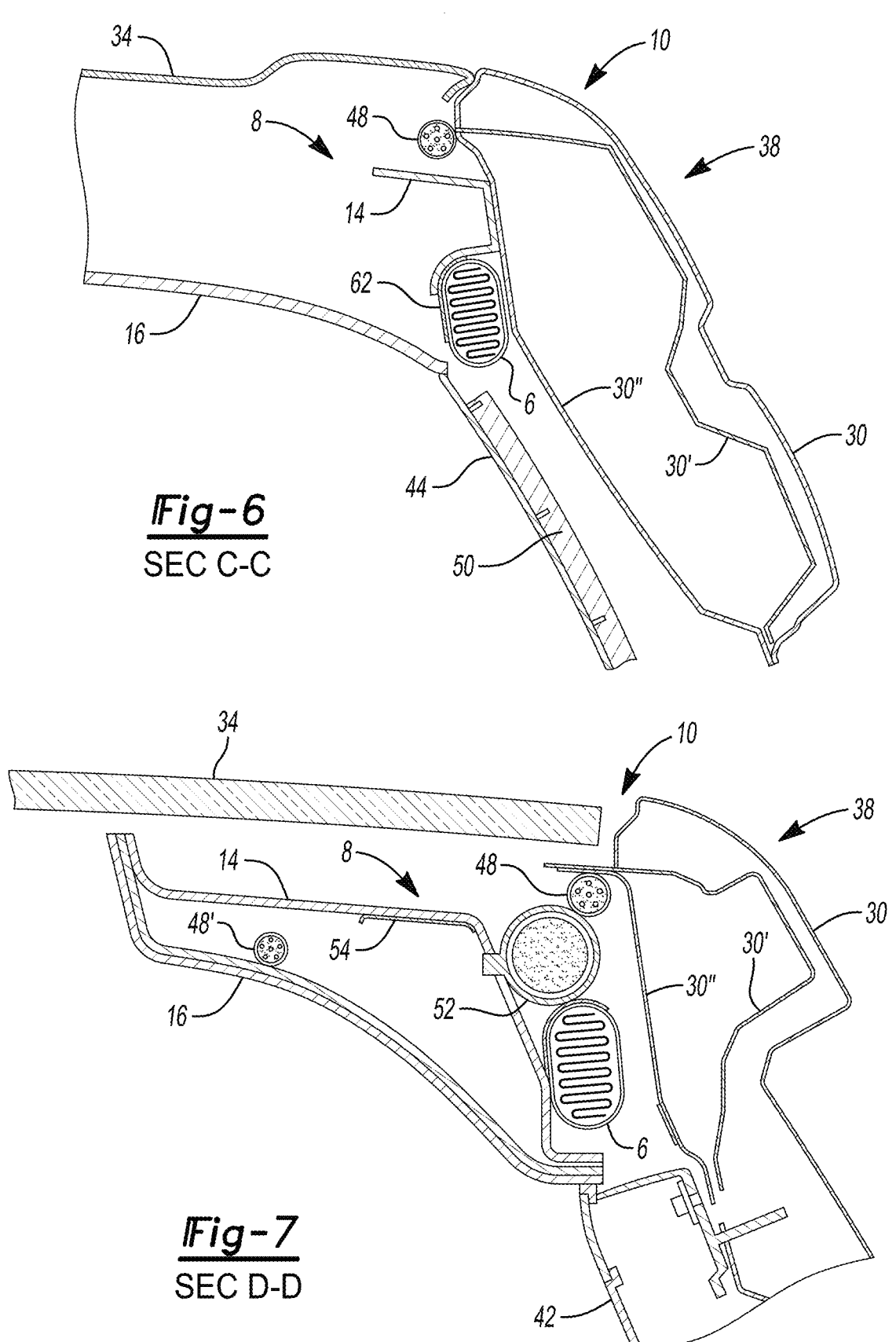
FIG. 6 shows a cross-sectional view, Section C-C, of an example of an integrated roof rail airbag/trim assembly attached to a vehicle body module.
FIG. 7 shows a cross-sectional view, Section D-D, of an example of an integrated roof rail airbag/trim assembly attached to a vehicle body module.

FIG. 6 shows a cross-sectional view, Section C-C, of an example of integrated roof rail airbag/trim assembly 10 attached to vehicle body module 38. Integrated roof rail airbag/trim assembly 10 comprises airbag carrier structural frame 8 and attached roof rail airbag 6. Roof rail airbag 6 may be attached to, and physically integrated with, airbag carrier structural frame 8 before integrated roof rail airbag/trim assembly 10 is attached to vehicle body module 38 (see FIGS. 2A and 2B). Airbag carrier structural frame 8 comprises a pair of corrugated or shaped structural channels: airbag carrier structural channel 14 and roof trim structural channel 16, which are rigidly attached to each other (e.g., by riveting, spot welding, or adhesive (glue) joining) to make airbag carrier structural frame 8. Airbag carrier structural channel 14 holds airbag 6 in a secure, fixed position relative to inner body structural panel 30''. Roof rail support 62 is attached to airbag carrier structural channel 14 and provides additional structural support to airbag 6. Airbag carrier structural channel 14 transfers deployment forces generated by an activated roof rail airbag to the body module 38, while maintaining integrity of integrated roof airbag/trim assembly 10 during deployment of airbag 6. Airbag carrier structural channel 14 is directly attached (e.g., welded, riveted, or adhesively attached) to inner body structural panel 30'' of body module 38. Roof structure 34, C-pillar 44, wiring harness 48, and sound adsorber 50 (which is disposed inside of C-pillar 44), are illustrated in this Figure.

FIG. 7 shows a cross-sectional view, Section D-D, of an example of integrated roof rail airbag/trim assembly 10 attached to vehicle body module 38. Integrated roof rail airbag/trim assembly 10 comprises airbag carrier structural frame 8 and attached roof rail airbag 6. Roof rail airbag 6 may be attached to, and physically integrated with, airbag carrier structural frame 8 before integrated roof rail airbag/trim assembly 10 is attached to vehicle body module 38 (see FIGS. 2A and 2B). Airbag carrier structural frame 8 comprises a pair of corrugated or shaped structural channels: airbag carrier structural channel 14 and roof trim structural channel 16, which are rigidly attached to each other (e.g., by riveting, spot welding, or adhesive (glue) joining) to make airbag carrier structural frame 8. Airbag carrier structural channel 14 holds airbag 6 in a secure, fixed position relative to inner body structural panel 30''. Attachment reinforcement plate 54 is disposed underneath airbag carrier structural channel 14. Airbag carrier structural channel 14 also transfers deployment forces generated by an activated roof rail airbag 6 to the body module 38, while maintaining integrity of integrated roof airbag/trim assembly 10 during deployment of airbag 6. Roof structure 34 (which may comprise roof glass), airbag inflator 52, B-pillar 42, and wiring harnesses 48 and 48' are illustrated in this Figure.

Figures 8, 9:
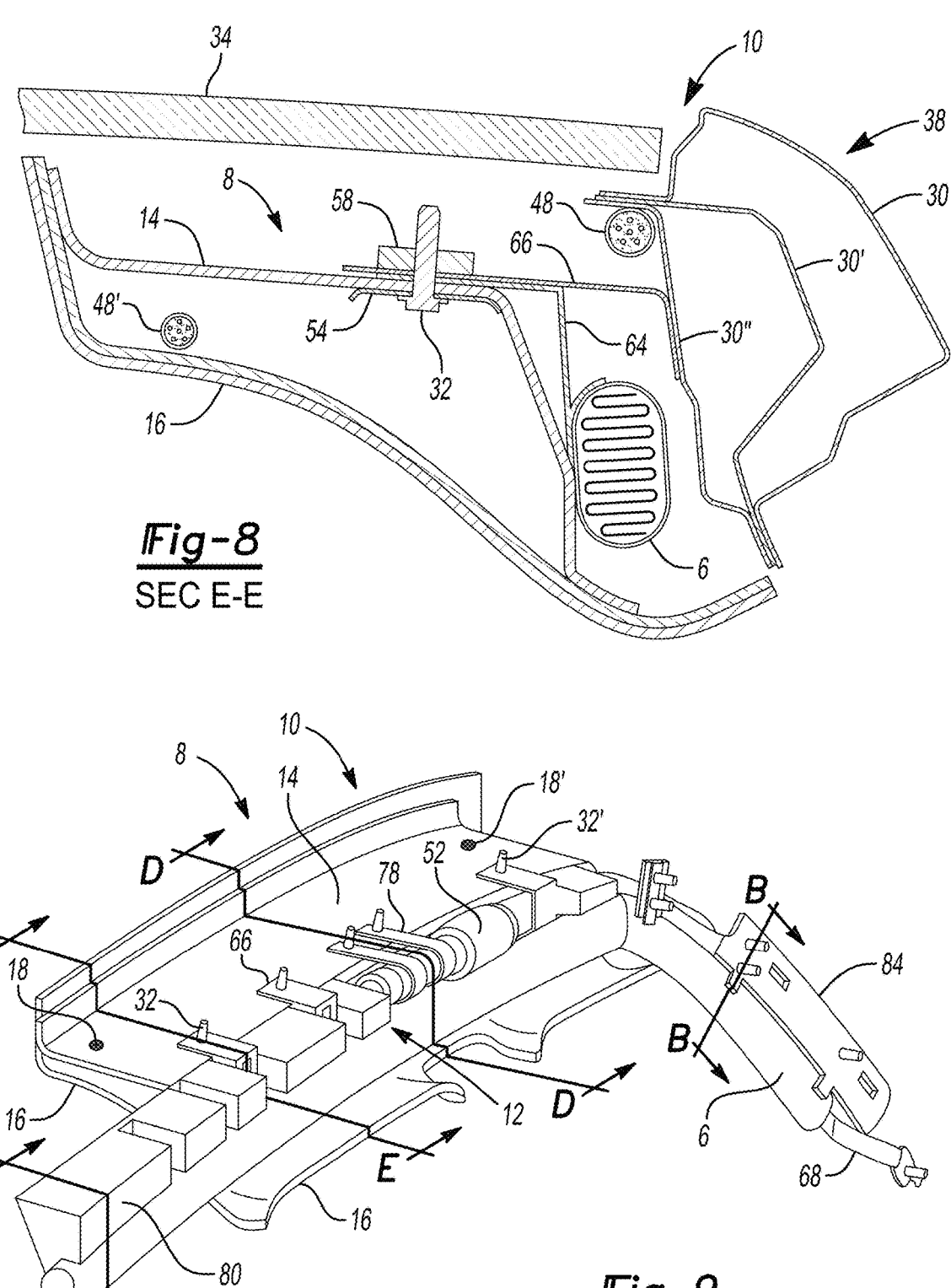
FIG. 8 shows a cross-sectional view, Section E-E, of an example of an integrated roof rail airbag/trim assembly attached to a vehicle body module.
FIG. 9 shows a perspective view of an example of an integrated roof rail airbag/trim assembly before being attached to a vehicle body module.

FIG. 8 shows a cross-sectional view, Section E-E, of an example of integrated roof rail airbag/trim assembly 10 attached to vehicle body module 38. Integrated roof rail airbag/trim assembly 10 comprises airbag carrier structural frame 8 and attached roof rail airbag 6. Roof rail airbag 6 may be attached to, and physically integrated with, airbag carrier structural frame 8 before integrated roof rail airbag/trim assembly 10 is attached to vehicle body module 38 (see FIGS. 2A and 2B). Airbag carrier structural frame 8 comprises a pair of corrugated or shaped structural channels: airbag carrier structural channel 14 and roof trim structural channel 16, which are rigidly attached to each other (e.g., by riveting, spot welding, or adhesive (glue) joining) to make airbag carrier structural frame 8. Airbag carrier structural channel 14 holds airbag 6 in a secure, fixed position relative to inner body structural panel 30''. Vehicle body attachment bracket 66 rigidly attaches airbag carrier structural channel 14 to inner body structural panel 30''. Reinforcement bracket 64 is attached to airbag carrier structural channel 14 and provides additional structural support to airbag 6. Airbag carrier structural channel 14 transfers deployment forces generated by an activated roof rail airbag to the body module 38, while maintaining integrity of integrated roof airbag/trim assembly 10 during deployment of airbag 6. Roof structure 34 (which may comprise roof glass) and wiring harnesses 48 and 48' are illustrated in this Figure.

Referring still to FIG. 8, airbag carrier attachment stud 32 attaches airbag carrier structural channel 14 to inner body structural panel 30'' via vehicle body attachment bracket 66. Airbag carrier attachment stud 32 may be inserted into a hole (not numbered) in airbag carrier structural channel 14 and then nut driver 36 (see FIG. 4) may be used to attach weld nut 58 to airbag carrier attachment stud 32 before roof structure 34 is installed and attached to body module 38.

FIG. 9 shows a perspective view of an example of integrated roof rail airbag/trim assembly 10 before being attached to vehicle body module 38 (not shown). Integrated roof rail airbag/trim assembly 10 comprises airbag carrier structural frame 8 and attached roof rail airbag 6. Roof rail airbag assembly 12 may be attached to, and physically integrated with, airbag carrier structural frame 8 before integrated roof rail airbag/trim assembly 10 is attached to vehicle body module 38 (see FIGS. 2A and 2B). Airbag carrier structural frame 8 comprises a pair of corrugated or shaped structural channels: airbag carrier structural channel 14 and roof trim structural channel 16, which are rigidly attached to each other (e.g., by riveting, spot welding, or adhesive (glue) joining) to make airbag carrier structural frame 8. Airbag carrier structural channel 14 holds airbag 6 in a secure, fixed position relative to airbag carrier structural frame 8. Vehicle body attachment bracket 66 is rigidly attached to airbag carrier structural channel 14. Inflator support bracket 78 is rigidly attached to airbag carrier structural channel 14 and provides structural support to airbag inflator 52. Automation grab points 18 and 18' are disposed on proximal and distal ends of airbag carrier structural channel 14, and may be used by a robotic arm (not shown) to grab on and then position integrated roof rail airbag/trim assembly 10 to its final position in vehicle body module 38. Support frame 84, airbag support block 80, and airbag tether 68 are illustrated.

Figure 10:
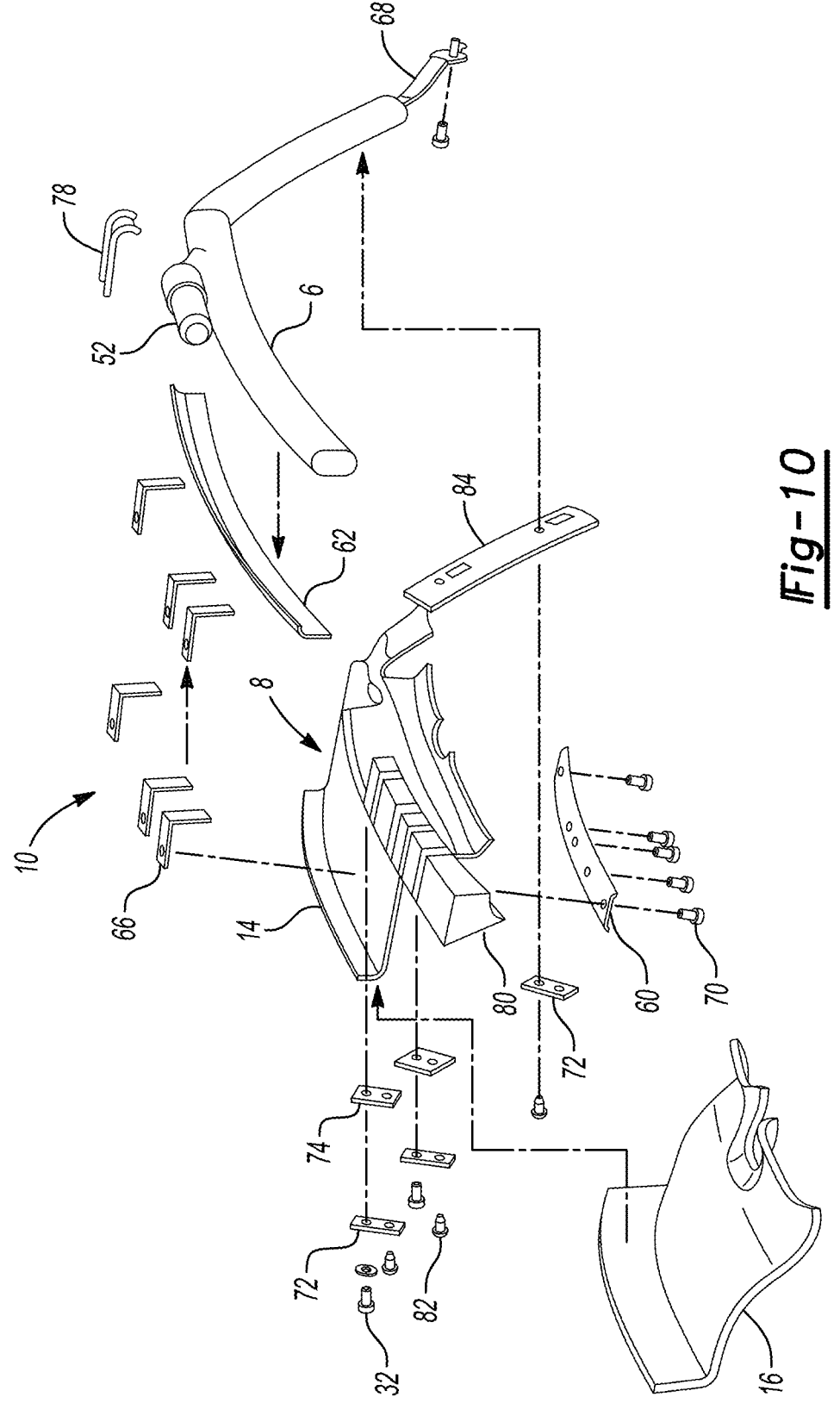
FIG. 10 shows an exploded, perspective assembly view of an example of an integrated roof rail airbag/trim assembly before being attached to a vehicle body module.

FIG. 10 shows an exploded, perspective assembly view of an example of integrated roof rail airbag/trim assembly 10 before being attached to a vehicle body module (not shown). Integrated roof rail airbag/trim assembly 10 comprises airbag carrier structural frame 8 and roof rail airbag 6. Airbag carrier structural frame 8 comprises a pair of corrugated or shaped structural channels: airbag carrier structural channel 14 and roof trim structural channel 16. Airbag 6, airbag carrier attachment stud 32, push pin 82, airbag reinforcement plate 72, vehicle body attachment bracket 66, attachment pad 74, carrier reinforcement plate 60, roof rail support 62, airbag inflator 52, airbag tether 68, and roof rail airbag assembly 12 are illustrated in their exploded positions before they are assembled into integrated roof rail airbag/trim assembly 10 (see, for example, FIGS. 3 and 9).

Figure 11:
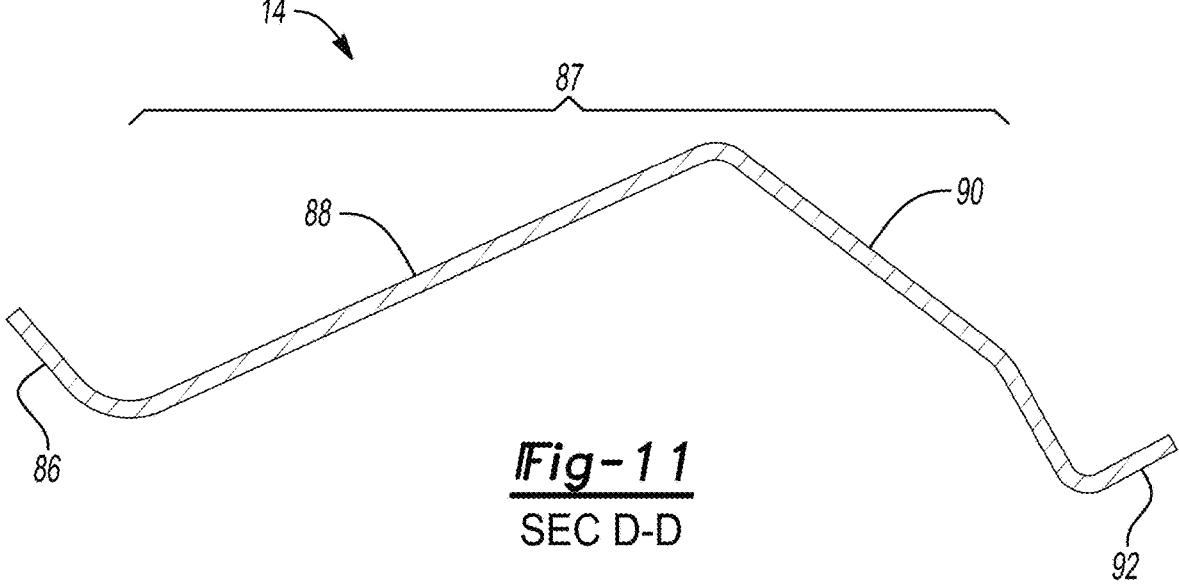
FIG. 11 shows a cross-sectional view, Section D-D, of an example of an airbag carrier structural channel.

FIG. 11 shows a cross-sectional view, Section D-D, of an example of airbag carrier structural channel 14. Airbag carrier structural channel 14 is a corrugated, monolithic structural panel with a central, inverted "V" segment 87 and a pair of continuous, upturned wing segments 86 and 92 disposed on the left and right ends of airbag carrier structural channel 14, respectively. Central, inverted "V" segment 87 comprises a continuous, left straight segment 88 and a continuous, right partially-bent segment 90.

A beam flexural rigidity (beam bending stiffness) of an individual, stand-alone, integrated roof rail airbag/trim assembly 10 may be determined by performing a standardized ASTM 3-point or 4-point bending test. The beam bending stiffness is measured in metric units of $N-m^2$.

In some embodiments, a beam bending stiffness of integrated roof rail airbag/trim assembly 10 before integrated roof rail airbag/trim assembly 10 has been attached to vehicle body module 38 may be greater than or equal to about 20 $N-m^2$ using a standardized ASTM 3-point or 4-point bending test. In other embodiments, the beam bending stiffness may be greater than or equal to about 25 $N-m^2$. In other embodiments, the beam bending stiffness may be sufficiently large (i.e., "stiff"), to allow an automated robotic arm to effectively and efficiently hold and manipulate integrated roof rail airbag/trim assembly 10 during positioning and attachment to vehicle body module 38.

By way of comparison, the beam bending stiffness of roof rail airbag 6 and/or roof rail airbag assembly 12 alone (i.e., without being attached to airbag carrier structural frame 8) may be as small as 1-2 $N-m^2$, which is generally considered to be too flexible and soft (i.e., "floppy") for an automated robotic arm to effectively and efficiently hold and manipulate the "rope-like" length of roof rail airbag assembly 12 during positioning and attachment to vehicle body module 38.

In some embodiments, an airbag carrier structural frame may be located above a roof rail airbag assembly, and it may be configured to provide a shaped, structural reaction surface that guides deployment of an activated roof rail airbag in an inwardly-downward direction that points between an occupant's sitting position and a vehicle-side daylight opening.

In some embodiments, an airbag carrier structural frame may be structurally configured to transfer roof rail airbag deployment forces directly to a vehicle's body structure, thereby causing airbag deployment in a desired direction when the roof rail airbag is activated.

In some embodiments, a roof rail airbag may have a longitudinal stress-concentration feature that is oriented substantially parallel to a centerline along a length of the roof rail airbag, which is configured to cause airbag deployment in an optimum direction when the roof rail airbag is deployed.

In Some Embodiments, a Method of Attaching an Integrated Roof Airbag/Trim Assembly May Comprise:

1) attaching a roof rail airbag assembly to an airbag carrier structural frame, thereby forming an integrated roof airbag/trim assembly; and then
2) attaching the integrated roof airbag/trim assembly to a vehicle body module;
3) wherein the roof rail airbag assembly comprises a roof rail airbag and an attached roof rail airbag inflator; and
4) wherein the airbag carrier structural frame comprises:
   (i) an airbag carrier channel; and
   (ii) a roof trim structural channel that is rigidly attached to the airbag carrier channel.

In some embodiments, an automated robot may be used to attach an integrated roof airbag/trim assembly to a vehicle body module.

In some embodiments, an integrated roof airbag/trim assembly may have one or more automation grab points that permit automated robotic attachment of the integrated roof airbag/trim assembly to a vehicle body module.

In some embodiments, an integrated roof airbag/trim assembly may be attached to a vehicle body module before a roof structure or glass roof is installed to the vehicle body module.

In some embodiments, at least one airbag carrier attachment stud may be not covered with a bolt cover.

In some embodiments, a roof rail airbag assembly may be located in-between an A-pillar and a C-pillar of a vehicle body module.

In some embodiments, a vehicle may comprise a vehicle body; a set of road wheels connected to the vehicle body; an airbag carrier structural frame; and a roof rail airbag assembly that comprises a roof rail airbag and an attached roof rail airbag inflator; wherein the roof rail airbag assembly is attached to, and is physically integrated with, the airbag carrier structural frame before the roof rail airbag assembly is attached to the vehicle body.

In some embodiments, the aforementioned structural channel(s) or structural frame(s) may comprise one or more corrugated sheets, shaped (e.g., curved) sheets, and/or sheets having a honeycombed or porous (foam)-based cross-section, and combinations thereof. Some examples of materials that may be used for these structural channels and frames include steel-alloys, magnesium alloys, aluminum alloys, titanium alloys, and/or fiber-reinforced polymer composite materials, including, with fibers selected from, but not limited to: carbon-based fibers, glass-based fibers, aramid-based fibers (e.g., Kevlar™), polyaramid fibers, and ceramic-based fibers, and combinations thereof.

The detailed description and the drawings or figures disclosed herein are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. All embodiments and examples disclosed herein are non-limiting embodiments and non-limiting examples. The words "a", "an", "the", "at least one", and "one or more" are used interchangeably to indicate that at least one of the items is present.

What is claimed is:

1. An integrated roof airbag/trim assembly, comprising:
an airbag carrier structural frame; and
a roof rail airbag assembly, comprising a roof rail airbag and a roof rail airbag inflator;
wherein the roof rail airbag assembly is attached to, and is physically integrated with, the airbag carrier structural frame;
wherein the airbag carrier structural frame comprises:
an airbag carrier structural channel;
a roof trim structural channel that is rigidly attached to the airbag carrier structural channel; and
at least two airbag carrier attachment studs that are attached to the airbag carrier structural channel;
wherein the integrated roof airbag/trim assembly comprises at least two automation grab points located at one end and at an opposite end of the airbag carrier structural channel, which are configured to permit automated robotic attachment of the integrated roof airbag/trim assembly to a vehicle body;
wherein the integrated roof airbag/trim assembly has a beam bending stiffness that is greater than or equal to about 20 N–m$^2$ before the integrated roof airbag/trim assembly has been attached to the vehicle body; and
wherein the beam bending stiffness is measured by performing a standardized ASTM 3-point or 4-point bending test.

2. The integrated roof airbag/trim assembly of claim 1, further comprising:
an A-pillar body attachment bracket configured for attaching the roof rail airbag assembly to an A-pillar of the vehicle body; and
a C-pillar body attachment bracket configured for attaching the roof rail airbag assembly to a C-pillar of the vehicle body.

3. The integrated roof airbag/trim assembly of claim 2, wherein the A-pillar body attachment bracket is hinged at one or more front locations;
wherein the C-pillar body attachment bracket is hinged at one or more rear locations;
wherein a front portion of the integrated roof airbag/trim assembly is folded back and shortened before the integrated roof airbag/trim assembly is attached to the vehicle body; and/or

wherein a rear portion of the integrated roof airbag/trim assembly is folded back and shortened before the integrated roof airbag/trim assembly is attached to the vehicle body.

4. The integrated roof airbag/trim assembly of claim 2, wherein the airbag carrier structural frame, the A-pillar body attachment bracket, and the C-pillar body attachment bracket are:
(a) located above the roof rail airbag assembly; and
(b) are configured to provide a shaped, structural reaction surface that guides deployment of an activated roof rail airbag in an inwardly-downward direction pointing between an occupant's sitting position and a vehicle-side daylight opening.

5. The integrated roof airbag/trim assembly of claim 1, wherein the airbag carrier structural frame is structurally configured to transfer roof rail airbag deployment forces directly to the vehicle body, thereby causing airbag deployment in an inwardly-downward direction when the roof rail airbag is activated.

6. The integrated roof airbag/trim assembly of claim 1, wherein the integrated roof airbag/trim assembly is disposed in-between an A-pillar and a C-pillar of the vehicle body.

7. The integrated roof airbag/trim assembly of claim 1, wherein the roof rail airbag assembly comprises one or more support structures that are configured to transfer deployment forces generated by an activated roof rail airbag to a vehicle's body structure, while maintaining integrity of the integrated roof airbag/trim assembly during deployment of the activated roof rail airbag.

8. A method, comprising:
attaching a roof rail airbag assembly to an airbag carrier structural frame, thereby making an integrated roof airbag/trim assembly; then
attaching the integrated roof airbag/trim assembly to a vehicle body; and then
installing a roof structure or a glass roof on the vehicle body after the integrated roof airbag/trim assembly has been attached to the vehicle body;
wherein the roof rail airbag assembly comprises a roof rail airbag and a roof rail airbag inflator;
wherein the airbag carrier structural frame comprises:
an airbag carrier structural channel; and
a roof trim structural channel that is rigidly attached to the airbag carrier structural channel;
wherein attaching the integrated roof airbag/trim assembly to the vehicle body comprises using an automated robot to perform the attaching;
wherein attaching the integrated roof airbag/trim assembly to the vehicle body further comprises using an automated robot to grab at least two automation grab points located at one end and at an opposite end of the airbag carrier structural frame, and then using the automated robot to attach the integrated roof airbag/trim assembly to the vehicle body by using a plurality of airbag carrier attachment studs located along the airbag carrier structural channel;
wherein the integrated roof airbag/trim assembly has a beam bending stiffness that is greater than or equal to about 20 N–m$^2$ before the integrated roof airbag/trim assembly has been attached to the vehicle body;
wherein the beam bending stiffness is measured by performing a standardized ASTM 3-point or 4-point bending test, and
wherein the roof rail airbag assembly is attached to, and is physically integrated with, the airbag carrier structural frame before the roof rail airbag assembly is attached to the vehicle body.

9. The method of claim 8, further comprising:

folding back a front portion of the integrated roof airbag/trim assembly at a hinged A-pillar body attachment bracket; and/or folding back a rear portion of the integrated roof airbag/trim assembly at a hinged C-pillar body attachment bracket;

thereby shortening a portion of the integrated roof airbag/trim assembly before attaching the integrated roof airbag/trim assembly to the vehicle body; and thereby creating a dimensional clearance that allows one or more body-side attachment studs to be fitted to the vehicle body during vehicle body manufacture.

10. The method of claim 8, wherein the roof rail airbag assembly is located in-between an A-pillar and a C-pillar of the vehicle body module.

11. The method of claim 8, wherein the roof rail airbag assembly comprises one or more support structures that are configured to transfer deployment forces generated by an activated roof rail airbag to a vehicle's body structure, while maintaining integrity of the integrated roof airbag/trim assembly during deployment of the activated roof rail airbag.

12. The method of claim 8, further comprising rigidly attaching the airbag carrier structural channel to the roof trim structural channel by riveting, spot welding, or adhesive joining.

13. A vehicle, comprising:

a vehicle body;

a set of road wheels connected to the vehicle body; and an integrated roof airbag/trim assembly attached to the vehicle body;

wherein the integrated roof airbag/trim assembly comprises:

an airbag carrier structural frame; and a roof rail airbag assembly, comprising a roof rail airbag and a roof rail airbag inflator;

wherein the airbag carrier structural frame comprises:

an airbag carrier structural channel;

a roof trim structural channel that is rigidly attached to the airbag carrier structural channel; and at least two attachment study attached to the airbag carrier structural channel;

wherein the roof rail airbag assembly is attached to, and is physically integrated with, the airbag carrier structural frame before the roof rail airbag assembly is attached to the vehicle body; and wherein the integrated roof airbag/trim assembly comprises at least two automation grab points located at one end and at an opposite end of the airbag carrier structural frame, that are configured to permit automated robotic attachment of the integrated roof airbag/trim assembly to the vehicle body.

14. The vehicle of claim 13, wherein the integrated roof airbag/trim assembly has a beam bending stiffness that is greater than or equal to about 20 N–m$^2$ before the integrated roof airbag/trim assembly has been attached to the vehicle body; and wherein the beam bending stiffness is measured by performing a standardized ASTM 3-point or 4-point bending test.

15. The vehicle of claim 13, further comprising:

an A-pillar body attachment bracket configured for attaching the roof rail airbag assembly to an A-pillar of the vehicle body; and a C-pillar body attachment bracket configured for attaching the roof rail airbag assembly to a C-pillar of the vehicle body.

16. The vehicle of claim 15, wherein the A-pillar body attachment bracket is hinged at one or more front locations;

wherein the C-pillar body attachment bracket is hinged at one or more rear locations;

wherein a front portion of the integrated roof airbag/trim assembly is folded back and shortened before the integrated roof airbag/trim assembly is attached to the vehicle body; and/or wherein a rear portion of the integrated roof airbag/trim assembly is folded back and shortened before the integrated roof airbag/trim assembly is attached to the vehicle body.

17. The vehicle of claim 15, wherein the airbag carrier structural frame, the A-pillar body attachment bracket, and the C-pillar body attachment bracket are:

(a) located above the roof rail airbag assembly; and (b) are configured to provide a shaped, structural reaction surface that guides deployment of an activated roof rail airbag in an inwardly-downward direction pointing between an occupant's sitting position and a vehicle-side daylight opening.

18. The vehicle of claim 13, wherein the airbag carrier structural frame is structurally configured to transfer roof rail airbag deployment forces directly to a vehicle body, thereby causing airbag deployment in an inwardly-downward direction when the roof rail airbag is activated.

19. The vehicle of claim 13, wherein the integrated roof airbag/trim assembly is disposed in-between an A-pillar and a C-pillar of a vehicle body.

20. The vehicle of claim 13, wherein the roof rail airbag assembly comprises one or more support structures that are configured to transfer deployment forces generated by an activated roof rail airbag to a vehicle's body structure, while maintaining integrity of the integrated roof airbag/trim assembly during deployment of the activated roof rail airbag.

\* \* \* \* \*